(12) United States Patent
Sing et al.

(10) Patent No.: US 12,303,089 B2
(45) Date of Patent: May 20, 2025

(54) METHOD AND HOUSEHOLD APPLIANCE

(71) Applicant: BSH Hausgeräte GmbH, Munich (DE)

(72) Inventors: Alexander Sing, Wittislingen (DE); Johannes Jall, Höchstädt (DE); Heiko Fritz, Herbrechtingen (DE); Andreas Hitzler, Holzheim (DE)

(73) Assignee: BSH Hausgeräte GmbH, Munich (DE)

( * ) Notice: Subject to any disclaimer, the term of this patent is extended or adjusted under 35 U.S.C. 154(b) by 926 days.

(21) Appl. No.: 17/279,659

(22) PCT Filed: Oct. 1, 2019

(86) PCT No.: PCT/EP2019/076531
§ 371 (c)(1),
(2) Date: Mar. 25, 2021

(87) PCT Pub. No.: WO2020/074310
PCT Pub. Date: Apr. 16, 2020

(65) Prior Publication Data
US 2021/0386267 A1    Dec. 16, 2021

(30) Foreign Application Priority Data

Oct. 12, 2018    (DE) .................... 10 2018 217 545.4

(51) Int. Cl.
*A47L 15/42* (2006.01)
*B29C 43/02* (2006.01)
(Continued)

(52) U.S. Cl.
CPC .......... *A47L 15/4209* (2016.11); *B29C 43/02* (2013.01); *B29C 43/18* (2013.01); *B29C 44/02* (2013.01); *B29C 44/14* (2013.01); *B29C 44/5681* (2013.01); *B32B 5/20* (2013.01); *B32B 7/12* (2013.01); *B32B 37/10* (2013.01); *B32B 37/12* (2013.01); *B32B 37/18* (2013.01); *D06F 37/02* (2013.01); *D06F 37/267* (2013.01);
(Continued)

(58) Field of Classification Search
CPC ...................................................... B29C 43/02
See application file for complete search history.

(56) References Cited

U.S. PATENT DOCUMENTS

| | | |
|---|---|---|
| 4,129,697 A | 12/1978 | Schapel |
| 5,044,705 A | 9/1991 | Nelson |
(Continued)

FOREIGN PATENT DOCUMENTS

| | | |
|---|---|---|
| DE | 4443919 A1 | 6/1996 |
| DE | 102011004945 A1 | 9/2012 |
(Continued)

OTHER PUBLICATIONS

National Search Report CN 2019800669806 dated Apr. 8, 2022.
International Search Report PCT/EP2019/076531 dated Apr. 21, 2020.

*Primary Examiner* — Jeffry H Aftergut
(74) *Attorney, Agent, or Firm* — Michael E. Tschupp; Andre Pallapies; Brandon G. Braun

(57) ABSTRACT

In a method for producing an insulation arrangement for a functional compartment of a household appliance, a plastic material is foamed to form a foam block. The foam block is divided into blanks and each blank is shaped with a forming press to form an insulation arrangement.

7 Claims, 14 Drawing Sheets

(51) Int. Cl.
  *B29C 43/18* (2006.01)
  *B29C 44/02* (2006.01)
  *B29C 44/14* (2006.01)
  *B29C 44/56* (2006.01)
  *B32B 5/20* (2006.01)
  *B32B 7/12* (2006.01)
  *B32B 37/10* (2006.01)
  *B32B 37/12* (2006.01)
  *B32B 37/18* (2006.01)
  *D06F 37/02* (2006.01)
  *D06F 37/26* (2006.01)
  *B29L 31/00* (2006.01)

(52) U.S. Cl.
  CPC ............... *B29C 2043/189* (2013.01); *B29K 2995/0002* (2013.01); *B29K 2995/0015* (2013.01); *B29L 2031/762* (2013.01); *B32B 2305/022* (2013.01); *B32B 2307/102* (2013.01); *B32B 2307/304* (2013.01); *B32B 2509/00* (2013.01)

(56) References Cited

U.S. PATENT DOCUMENTS

| | | | | |
|---|---|---|---|---|
| 6,152,259 | A | * | 11/2000 | Freist ............... A47L 15/4209 |
| | | | | 181/290 |
| 6,165,300 | A | | 12/2000 | Elsner |
| 6,827,894 | B1 | * | 12/2004 | Tilton ............... B29C 43/206 |
| | | | | 264/327 |
| 8,302,280 | B2 | * | 11/2012 | Neff ............... C08G 18/3206 |
| | | | | 68/3 R |
| 9,320,414 | B2 | | 4/2016 | Fritz |
| 10,279,513 | B2 | | 5/2019 | Kraatz |
| 2018/0317739 | A1 | | 11/2018 | Hill |

FOREIGN PATENT DOCUMENTS

| | | | |
|---|---|---|---|
| DE | 102011077734 | A1 | 12/2012 |
| DE | 202012103799 | U1 * | 1/2013 |
| DE | 102011083162 | A1 * | 3/2013 |
| EP | 2347938 | A1 | 7/2011 |
| EP | 3092935 | A1 | 11/2016 |
| EP | 3093935 | A1 * | 11/2016 |
| GB | 2028714 | A | 3/1980 |
| WO | WO-02/02318 | A1 * | 1/2002 |

* cited by examiner

METHOD AND HOUSEHOLD APPLIANCE

CROSS-REFERENCES TO RELATED APPLICATIONS

This application is the U.S. National Stage of International Application No. PCT/EP2019/076531, filed Oct. 1, 2019, which designated the United States and has been published as International Publication No. WO 2020/074310 A2 and which claims the priority of German Patent Application, Serial No. 10 2018 217 545.4, filed Oct. 12, 2018, pursuant to 35 U.S.C. 119(a)-(d).

BACKGROUND OF THE INVENTION

The present invention relates to a method for producing an insulation arrangement for a functional compartment, in particular a dishwashing compartment, of a household appliance, in particular a household dishwasher, to a further method for producing an insulation arrangement for a functional compartment, in particular a dishwashing compartment, of a household appliance, in particular a household dishwasher, to a method for producing a household appliance, in particular a household dishwasher, and to a household appliance, in particular a household dishwasher.

For acoustic insulation of a dishwashing compartment of a household dishwasher bitumen mats can be applied to the outside of the dishwashing compartment. These bitumen mats can be glued to the outside of the dishwashing compartment with a hot melt adhesive for example. Such bitumen mats have a high thermal conductivity capacitance however and conduct the heat away from the dishwashing compartment. If the proportion of the surface of the dishwashing compartment covered by the bitumen mats is reduced, the energy consumption of the household dishwasher is able to be reduced. This reduction in the surface covered by the bitumen mats however results in the noise emitted by the household dishwasher increasing.

Publication EP 3 092 935 A1 discloses an arrangement for thermal and acoustic insulation of a receiving area of a household dishwasher. The arrangement comprises a first insulation element for thermal insulation of the receiving area and a second insulation element for acoustic insulation of the receiving area, wherein the first insulation element is arranged between the receiving area and the second insulation element and wherein the first insulation element is foamed directly to the receiving area.

BRIEF SUMMARY OF THE INVENTION

Against this background, an object of the present invention is to make available an improved method for producing a functional compartment, in particular a dishwashing compartment, of a household appliance, in particular a household dishwasher.

Accordingly a method is proposed for producing an insulation arrangement for a functional compartment, in particular a dishwashing compartment, of a household appliance, in particular a household dishwasher. The method comprises the steps; a) foaming a plastic material to form a foam block, b) dividing the foam block into blanks, and c) shaping each blank with the aid of a forming press to form the insulation arrangement.

With the aid of the above method short cycle times of the forming press can be achieved by comparison with producing the insulation arrangement as a shaped foam part. A diversity of raw materials can further be processed for the plastic material. This expands the area of application of the insulation arrangement.

The plastic material can have a number of components, which are mixed to produce the insulation element and react chemically with one another in such a way that the plastic material completely cures and/or cross-links. The forming press preferably comprises a cavity, which maps a negative of a geometry of the insulation arrangement. The insulation arrangement preferably comprises different insulation elements, namely a first insulation element and a second insulation element. The insulation arrangement can just have the first insulation element however. This means that the second insulation element is optional.

In accordance with a form of embodiment the insulation arrangement has a first insulation element and a second insulation element, wherein before step c) the second insulation element is placed in the forming press, and wherein in step c) the respective blank is shaped to form the first insulation element and is connected to the second insulation element.

In particular the first insulation element is arranged, in an installed state of the insulation arrangement, between the functional compartment, in particular the dishwashing compartment, and the second insulation element. The second insulation element can be a bitumen mat.

In accordance with a further exemplary embodiment the first insulation element is connected to the second insulation element with the aid of an adhesive.

The adhesive is optional. The adhesive can be applied to the second insulation element as an adhesive layer. The adhesive can be a hot melt adhesive.

In accordance with a further exemplary embodiment the plastic material can be foamed in step a) at atmospheric pressure.

The plastic material can also be foamed in a vacuum or at lower pressure. The particular advantage here lies in the low density of the foamed material that can be achieved. A low density in the insulation arrangement is thus able to be achieved, whereby the heat insulation properties are improved. The lower density also results in a lower use of material. Little material produces a reduced absolute thermal capacity. The result of a low thermal capacity is an additional heat saving, since material does not have to be heated up.

In accordance with a further exemplary embodiment the plastic material is foamed on in step c) in an open mold.

As an alternative the foam block can also be produced without this type of mold in a continuous method.

A further method for producing an insulation arrangement for a functional compartment, in particular a dishwashing compartment, of a household appliance is further proposed. The method comprise the steps: a) placing an insulation element in a mold, b) introducing a liquid plastic material into the mold, in order to foam a further insulation element onto the insulation element and form the insulation arrangement in this way, and c) removing the insulation arrangement from the mold.

The insulation arrangement is thus a composite component, which can be attached in its entirety to the functional compartment, in particular the dishwashing compartment. In particular in step a) the second insulation element is placed in the mold. In particular in step b) the first insulation element is foamed onto the second insulation element.

In accordance with a form of embodiment the insulation element is surface-treated before step a).

The surface treatment can be plasma treatment, a corona treatment or the like for example. An additional coating of one of the insulation elements can also be provided. This can be applied to the second insulation element in the production process for example.

A method is further proposed for producing a household appliance, in particular a household dishwasher. The method comprises the steps: a) provision of a functional compartment, in particular a dishwashing compartment, b) provision of a first insulation element, c) provision of a second insulation element, and d) attachment of the first insulation element and the second insulation element one after another to the functional compartment, in particular the dishwashing compartment, in such a way that the first insulation element is arranged between the functional compartment, in particular the dishwashing compartment, and the second insulation element.

The insulation arrangement is thus a multi-part arrangement. This results in high flexibility in production. The binding of the first insulation element to the functional compartment, in particular the dishwashing compartment, is also improved. Different variants of the household appliance, in particular the household dishwasher, can thus be generated more easily.

In accordance with a form of embodiment the second insulation element is connected to an outer casing before step d).

The outer casing can be part of a housing of the household appliance, in particular the household dishwasher.

A household appliance, in particular a household dishwasher, with a functional compartment, in particular a dishwashing compartment, and an insulation arrangement for thermal and/or acoustic insulation of the functional compartment, in particular the dishwashing compartment, is further proposed, wherein the insulation arrangement has a first insulation element and a second insulation element, wherein the first insulation element is arranged between the functional compartment, in particular the dishwashing compartment, and the second insulation arrangement, wherein the insulation arrangement partly covers the functional compartment, in particular the dishwashing compartment, and wherein the functional compartment, in particular the dishwashing compartment, is partly only covered by a further, second insulation element.

The second insulation element is in particular a bitumen mat. This means that the functional compartment, in particular the dishwashing compartment, is partly only covered by the second insulation element and partly by the insulation arrangement, which has both insulation elements.

Further possible implementations of the invention also include combinations not explicitly stated of features or forms of embodiment described previously or below with regard to the exemplary embodiments. In such cases the person skilled in the art will also add individual aspects as improvements or additions to the respective basic form of the invention.

Further advantageous embodiments and aspects of the invention are the subject matter of the dependent claims as well as of the exemplary embodiments of the invention described below. Furthermore the invention will be described in greater detail with the aid of preferred forms of embodiment, which refer to the enclosed figures.

DETAILED DESCRIPTION OF EXEMPLARY EMBODIMENTS OF THE PRESENT INVENTION

Figure 1:
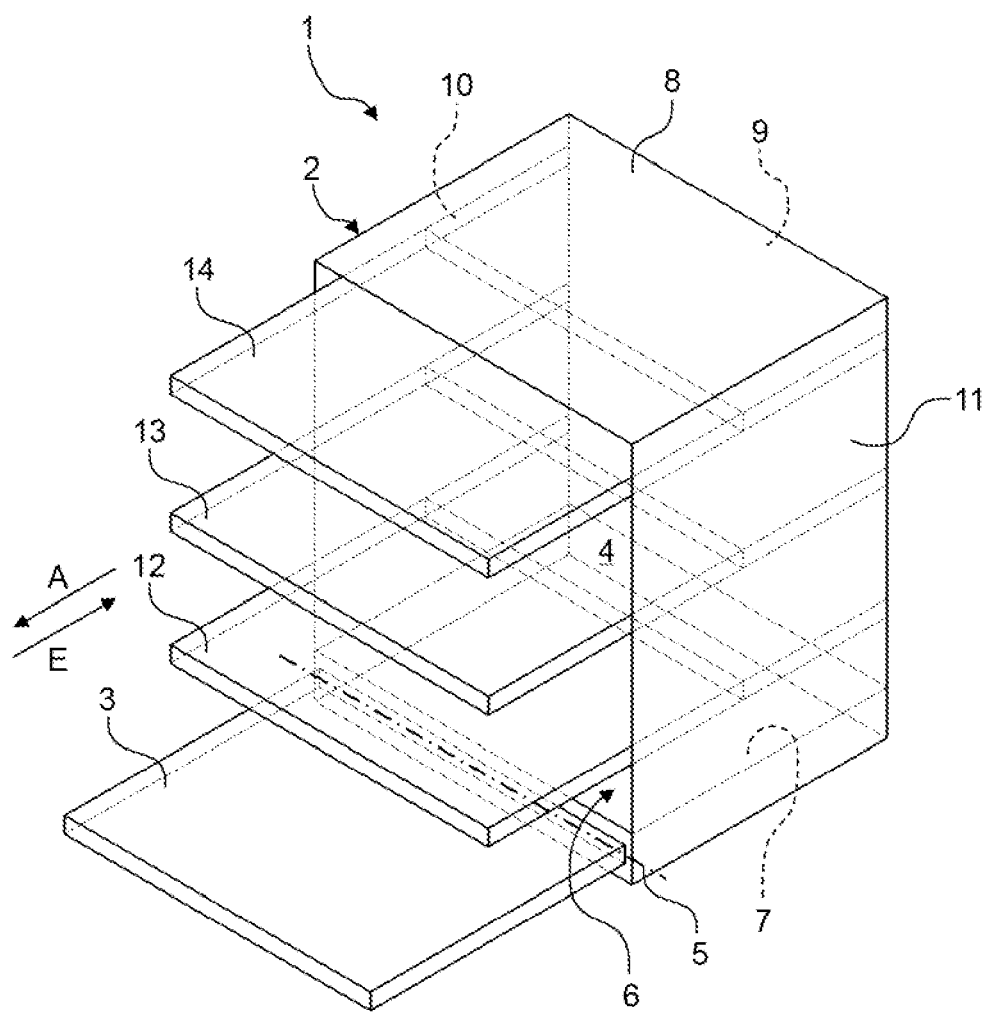
FIG. 1 shows a schematic perspective view of a form of embodiment of a household appliance embodied as a household dishwasher.

Elements that are the same or have the same function have been provided with the same reference characters in the figures, unless otherwise specified.

FIG. 1 shows a schematic perspective view of a form of embodiment of a household appliance 1 embodied as a household dishwasher. The household dishwasher 1 comprises a functional compartment embodied as a dishwashing compartment 2, which is able to be closed off, by a door 3, in a water-tight manner in particular. To this end a sealing ring can be provided between the door 3 and the dishwashing compartment 2. The dishwashing compartment 2 is preferably cuboid in shape. The dishwashing compartment 2 can be arranged in a housing of the household dishwasher 1. The dishwashing compartment 2 and the door 3 can form a dishwashing space 4 for washing dishes.

The door 3 is shown in FIG. 1 in its opened position. Pivoting the door 3 about a pivot axis 5 provided at the bottom end of it enables the door 3 to be closed or opened. With the aid of the door 3 a loading opening 6 of the dishwashing compartment 2 can be closed or opened. The dishwashing compartment 2 has a floor 7, a roof 8 arranged opposite to the floor 7, a rear wall 9 arranged opposite to the closed door 3 and two side walls 10, 11 arranged opposite to one another. The floor 7, the roof 8, the rear wall 9 and the side walls 10, 11 can be made of a sheet of stainless steel for example. As an alternative the floor 7 can be made of a plastic material.

The household dishwasher 1 further has at least one dishwashing receptacle 12 to 14. Preferably a number of dishwashing receptacles, for example three dishwashing receptacles 12 to 14 can be provided, wherein the dishwashing receptacle 12 can be a lower dishwashing receptacle or dish rack, the dishwashing receptacle 13 can be an upper dishwashing receptacle or dish rack and the dishwashing receptacle 14 can be a cutlery drawer. As FIG. 1 also shows, the dishwashing receptacles 12 to 14 are arranged above one another in the dishwashing compartment 2. Each dishwashing receptacle 12 to 14 is optionally able to be supported for movement into or out of the dishwashing compartment 2. In particular each dishwashing receptacle 12 to 14 is able to be pushed or guided into the dishwashing compartment 2 in an insertion direction E (arrow) and be pulled or moved out of the dishwashing compartment 2 against the insertion direction E (arrow) in a pull-out direction A (arrow).

The inventive household appliance 1 can in a general way be a household dishwasher, a household washing machine or a household washer/dryer. Depending on the type of household appliance, the functional compartment can be a dishwashing compartment, a washing liquid compartment or a washing drum. A household washing machine of this type is known for example from publication EP 2 049 723 A1, while a household washer/dryer of this type is known from publication DE 33 45 303 A1. The related content of these publications given by way of example is herewith made subject matter of the present description.

Figure 2A:
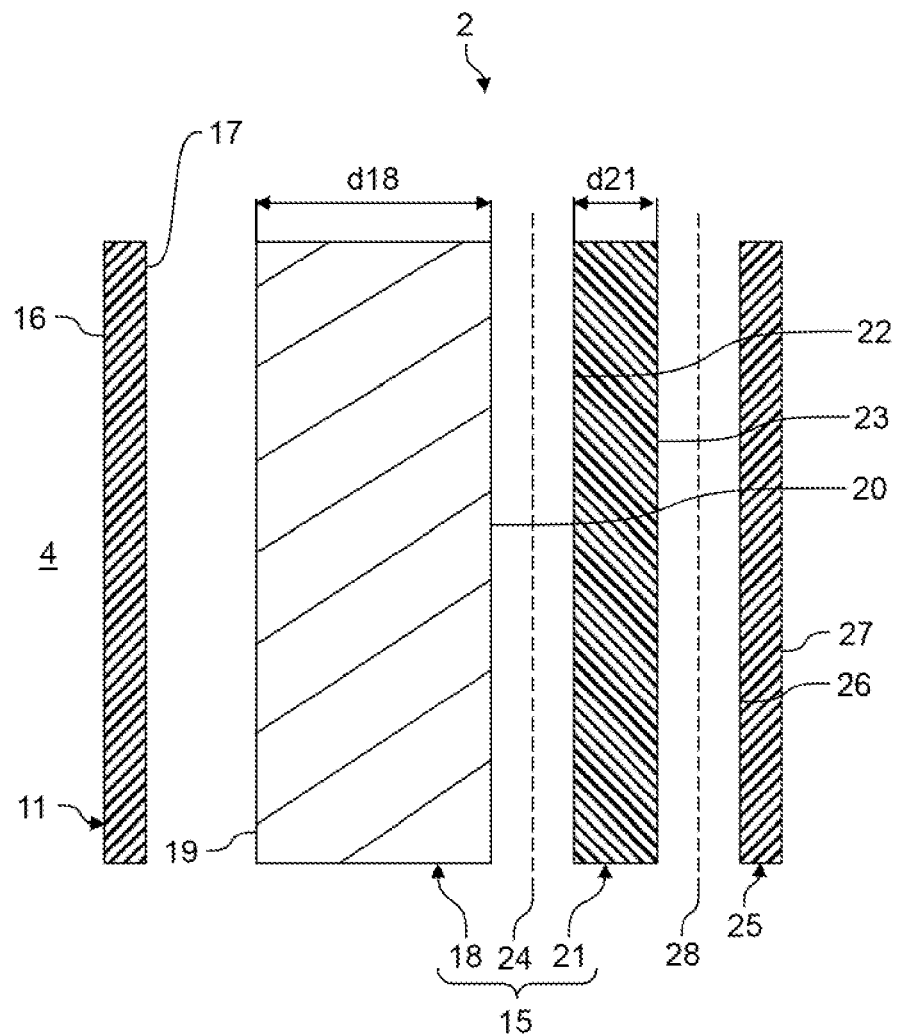
FIG. 2A shows a schematic part cross-sectional view of a form of embodiment of a dishwasher compartment for the household dishwasher in accordance with FIG. 1 in an exploded diagram.
Figure 3A:
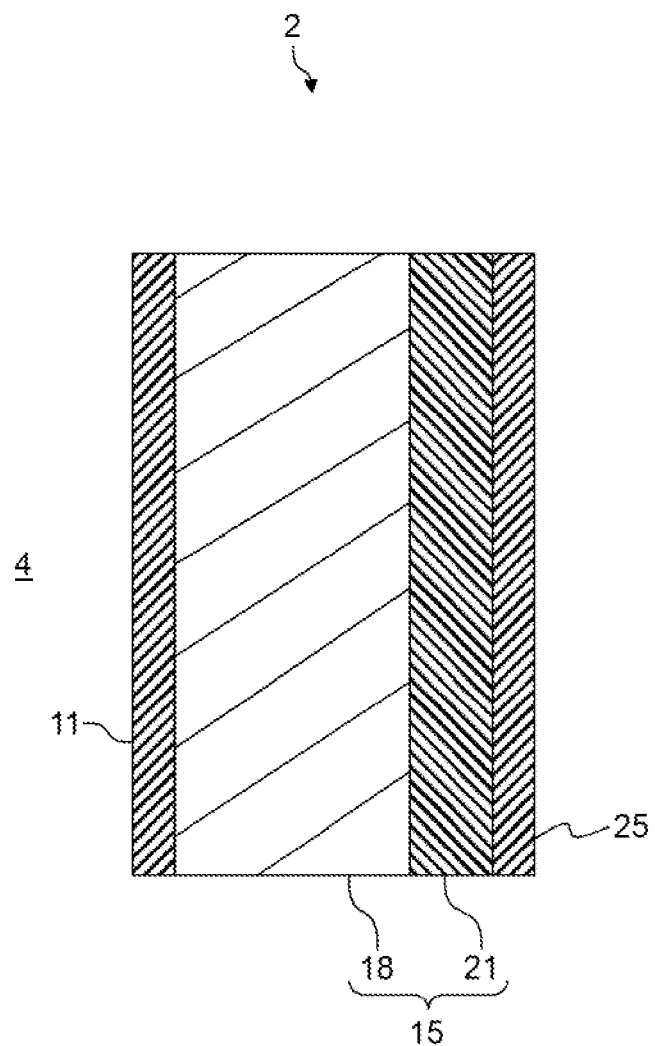
FIG. 3A shows a further schematic part cross-sectional view of the dishwasher compartment in accordance with FIG. 2A.

FIG. 2A shows a schematic part cross-sectional view of a form of embodiment of the dishwashing compartment 2 in an exploded view. FIG. 3A shows a further cross-sectional view of the dishwashing compartment 2. Only the side wall 11 of the dishwashing compartment is shown in FIGS. 2A and 3A. The household dishwasher 1 comprises an insulation arrangement 15 for thermal and/or acoustic insulation of the dishwashing compartment 2. The insulation arrangement 15 can be provided on the two side walls 10, 11, the roof 8, rear wall 9 and/or the door 3. The insulation arrangement 15 can further also be provided on the floor 7. This means that the dishwashing compartment 2 can be accommodated in the insulation arrangement 15 and it can surround or enclose said compartment at least to some extent. The insulation arrangement 15 is provided on the outer side of the dishwashing compartment 2. "On the outer side" here means directed away from the dishwashing space 4.

The side wall 11 in particular comprises an inner side 16, which is directed towards the dishwashing space 4, and an outer side 17, which is directed away from the dishwashing space 4. The insulation arrangement 15 is provided on the outer side 17. The insulation arrangement 15 comprises a first insulation element 18. The first insulation element 18 is suitable for insulating the dishwashing compartment 2 thermally and/or acoustically. The first insulation element 18 can also be referred to as the thermal and/or acoustic insulation element. The first insulation element 18 has a first surface 19, which is directed towards the outer side 17 of the side wall 11. Furthermore the first insulation element 18 comprises a second surface 20 directed away from the first surface 19. The first insulation element 18 is preferably produced from a foam plastic material, in particular from a foam polyurethane.

Preferably the first insulation element 18 has an open-pore structure, so that the first insulation element 18 is compressible. The plastic material has the property that, in a cured and/or cross-linked state, it preferably has gluing or preferably adhesive properties. The preferably adhesive properties are provided in particular on the surfaces 19, 20 of the first insulation element 18. In this case the plastic material itself has the preferably adhesive properties without the addition of an adhesive.

The fact that the first surface 19 preferably has adhesive properties enables the first insulation element 18 to adhere to the dishwashing compartment 2 or to the side wall 11 with the first surface 19 directed towards the dishwashing compartment 2. The connection between the side wall 11 and the first insulation element 18 is free from adhesive in this case. This means that no layer of adhesive is provided between the side wall 11 and the first insulation element 18. This enables the first insulation element 18 to be released from the side wall 11 in a non-destructive manner and also without leaving any residues. In such a case however slight residues can be left on the dishwashing compartment 2. This means that the first insulation element 18 is able to be released easily from the dishwashing compartment 2 but residues can be left on the dishwashing compartment 2. These can be removed by rubbing. In particular the first insulation element 18 can be separated from the dishwashing compartment 2 without aids, such as solvents for example. The connection between the first insulation element 18 and the dishwashing compartment 2 can be a weakly-adhesive glue connection.

The first insulation element 18 has a thickness d18. The thickness d18 preferably amounts to 5 to 50 mm, further preferably to 10 to 45 mm, further preferably to 15 to 40 mm, further preferably to 20 to 35 mm, further preferably to 25 to 30 mm. A density $\rho 18$ of the first insulation element 18 preferably amounts to 5 to 150 kg/m$^3$, especially preferably to 50 to 120 kg/m$^3$, further preferably to 70 to 100 kg/m$^3$. A specific thermal conductivity $\lambda 18$ of the first insulation element 18 is preferably less than 0.1 W/(m*K), in particular less than 0.5 W/(m*K). The first insulation element 18 furthermore preferably has a specific thermal capacity c18 of less than 2.000 J(kg*K), preferably of less than 1.600 J(kg*K), further preferably of less than 1.400 J(kg*K).

As well as the first insulation element 18, the insulation arrangement 15 comprises a second insulation element 21 for acoustic insulation of the dishwashing compartment 2. The second insulation element 21 can also be referred to as an acoustic insulation element. The second insulation element 21 serves in particular as a bulk layer and improves the acoustic properties of the insulation arrangement 15. The second insulation element 21 is likewise provided on the outer side of the dishwashing compartment 2. In this case the first insulation element 18 is positioned between the dishwashing compartment 2 and the second insulation element 21. The second insulation element 21 comprises a first surface 22 directed towards the first insulation element 18 and a second surface 23 directed away from the first surface 22. Preferably the second insulation element 21 is able to be separated in a non-destructive manner from the first insulation element 18. The second insulation element 21 can however also be connected to the first insulation element 18 in a non-releasable manner.

The second insulation element 21 has a thickness d21. The thickness d21 is smaller than the thickness d18 of the first insulation element 18. For example the thickness d21 can amount to 1 to 10 mm, further preferably to 1 to 8 mm, further preferably to 1 to 5 mm, further preferably to 1 to 3 mm. In particular the first insulation element 18 prevents heat being transmitted from the dishwashing compartment 2 to the second insulation element 21. This means that the second insulation element 21 cannot extract any heat from the dishwashing compartment 2. The energy efficiency of the household dishwasher 1 is thereby improved. In the second insulation element 21 vibrations of the dishwashing container 2 are converted into heat.

The first insulation element 18, as already mentioned, is suitable for damping vibrations. A loss factor of the plastic material of the first insulation element 18 is high and is tuned to its use in the household dishwasher 1. A "loss factor" here is to be understood with physical vibrations of different natures as the ratio of the loss-affected imaginary part to the loss-free real part of a complex variable. The loss factor of the plastic material of the first insulation element 18 at 20° C. is in particular greater than 0.2, preferably greater than 0.4. Furthermore the hysteresis factor in accordance with the IFD method (hysteresis loss—IFD) as per ASTM D3574 is preferably greater than 15%, preferably greater than 20%, especially greater than 30%, and the recovery time as per ASTM D3574 is preferably greater than 2 s, preferably greater than 4, especially greater than 5 s. The vibrations are partly also passed on to the second insulation element 21. The second insulation element 21 in the insulation arrangement setup 15 essentially makes a surface mass available through its high density. In some examples, the first insulation element and the second insulation element have at least one of a same length or a same width.

The second insulation element 21 preferably has a far higher density than the first insulation element 18. The second insulation element 21 is preferably made of a bitumen material, in particular of a metal and/or stone-filled bitumen material, or of a plastic material, particularly of a metal and/or stone-filled plastic material. For example the second insulation element 21 can be made of a butyl material. The second insulation element 21 is in particular in the form of a plate or a mat. The second insulation element 21 can also be a sheet of metal, in particular a sheet of steel.

The second insulation element 21 serves to deaden the sound of the dishwashing compartment 2 or to damp vibrations of the dishwashing compartment 2. The second insulation element 21 preferably has as high a loss factor as possible. The loss factor of the material of the second insulation element 21 at 20° C. is preferably greater than 0.08, further preferably greater than 0.15. A density $\rho 21$ of the second insulation element 21 is preferably greater than 1,000 kg/m³.

The insulation arrangement 15 can furthermore comprise an optional separation layer 24. The separation layer 24 is positioned between the first insulation element 18 and the second insulation element 21, in particular between the surfaces 20, 22. The separation layer 24 can be a layer of wax, a film, for example a polyethylene film or the like. The separation layer 24 can also comprise a number of films. The separation layer 24 makes possible a non-destructive and residue-free separation of the second insulation element 21 from the first insulation element 18. The separation layer 24, as previously mentioned, is optional, so that the first insulation element 18 and the second insulation element 21 can also be joined inseparably to one another. For example the first insulation element 18 can be foamed directly onto the second insulation element 21. A layer of adhesive can further be provided between the insulation elements 18, 21.

The household dishwasher 1 furthermore comprises an outer casing 29. The outer casing 29 is arranged on the outer side of the insulation arrangement 15, in particular on the outer side of the second insulation element 25. The outer casing 29 can be a sheet of steel for example. The outer casing 29 can be part of a housing of the household dishwasher 1. The outer casing 29 can in particular also be part of the insulation arrangement 15.

The outer casing 29 can comprise a first surface 30 directed towards the second insulation element 25 and also a second surface 31 directed away from the second insulation element 25. The outer casing 29 can either lie loosely on the second insulation element 25 or be connected to said element in such a way that the outer casing 29 can be released from the second insulation element 25 without leaving residues and non-destructively. To this end a separation layer 32 can be provided between the second insulation element 25 and the outer casing 29. The separation layer 32 is optional. The separation layer 32 can be constructed identically to the separation layer 28.

The insulation arrangement 15 can also be designed so that said arrangement does not have the first insulation element 18 at least to some extent. For example the insulation arrangement 15 can have the first insulation element 18 and also the second insulation element 21 on the side wall 10. On the side wall 11 on the other hand the second insulation element 21, as a bitumen mat for example, can be attached directly to the dishwashing compartment 2. The same applies to the floor 7, the roof 8 and the rear wall 9. On the side wall 11 for example partly the insulation arrangement 15 with the first insulation element 18 and the second insulation element 21 and partly just the second insulation element 21 can also be provided. This enables a household dishwasher 1 that is both quiet and also energy-efficient to be realized at a low price. This also results in production advantages.

Advantages are further produced over the lifetime of the household dishwasher 1.

Figure 2B:
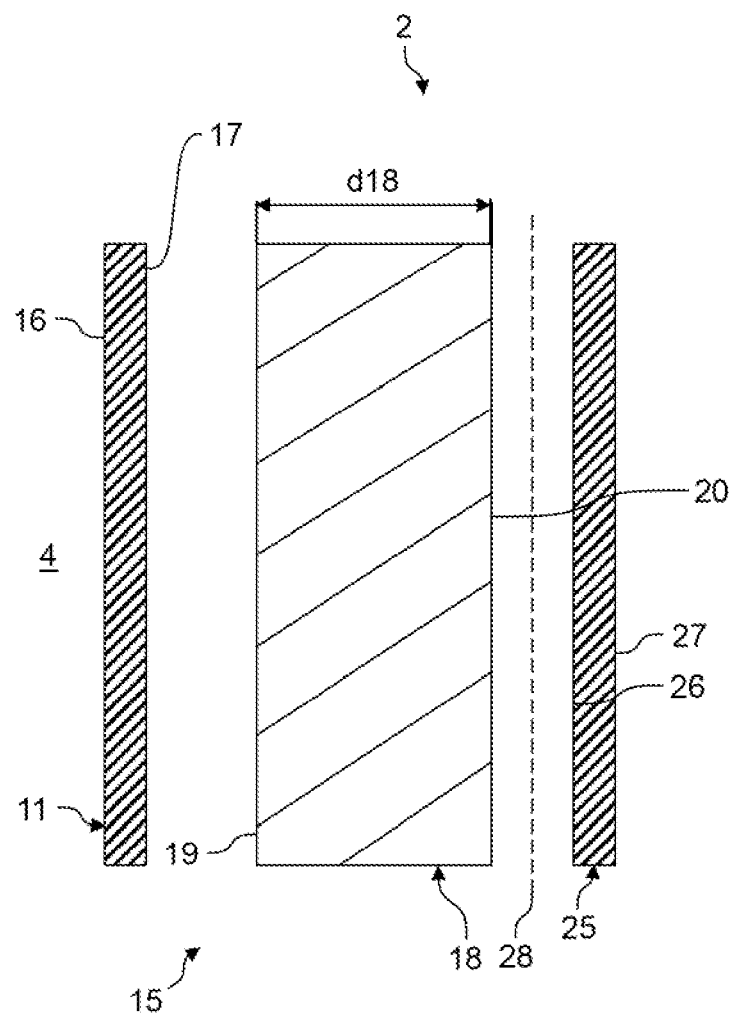
FIG. 2B shows a schematic part cross-sectional view of a further form of embodiment of a dishwasher compartment for the household dishwasher in accordance with FIG. 1 in an exploded diagram.
Figure 3B:
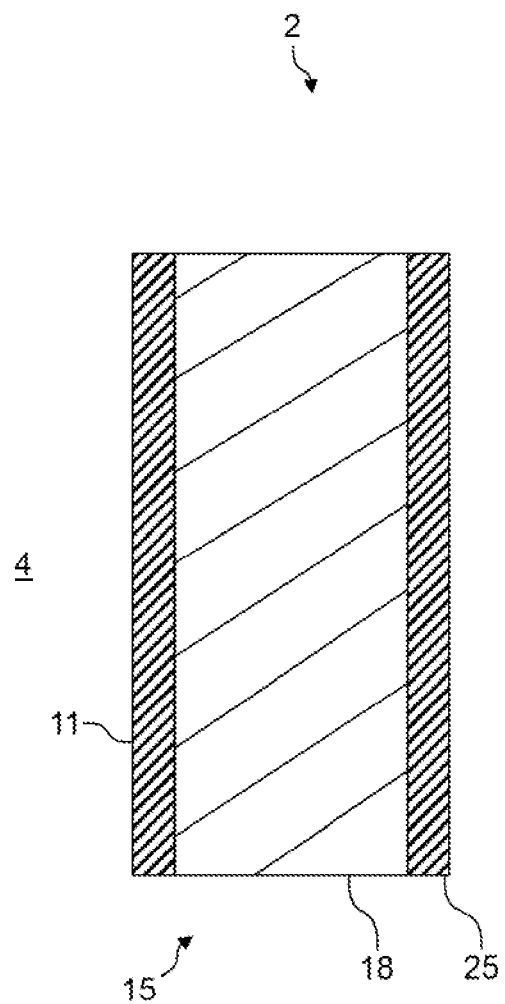
FIG. 3B shows a further schematic part cross-sectional view of the dishwasher compartment in accordance with FIG. 2B.

FIG. 2B shows a schematic part cross-sectional view of a further form of embodiment of the dishwashing compartment 2 in an exploded diagram. FIG. 3B shows a further part cross-sectional view of the dishwashing compartment 2. The dishwashing compartment 2 in accordance with FIGS. 2B and 3B differs from the dishwashing compartment 2 in accordance with FIGS. 2A and 3A only in that the insulation arrangement 15 has just the first insulation element 18. The second insulation element 21 is especially not provided.

Figure 4:
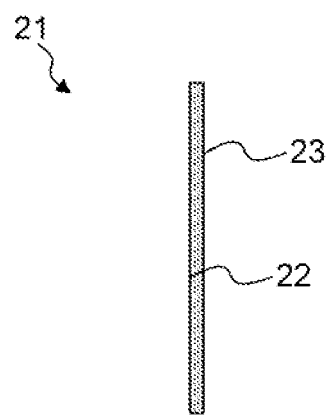
FIG. 4 shows a schematic cross-sectional view of a form of embodiment of an insulation element for the household dishwasher in accordance with FIG. 1.
Figure 5:
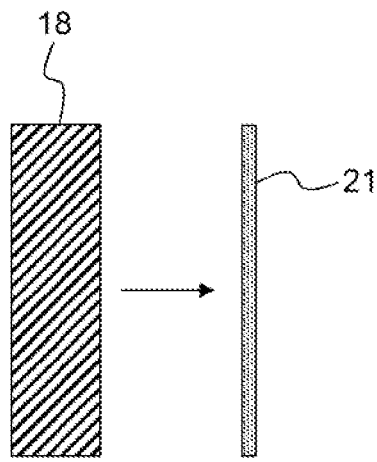
FIG. 5 shows a schematic exploded diagram of a form of embodiment of an insulation element for the household dishwasher in accordance with FIG. 1.
Figure 6:
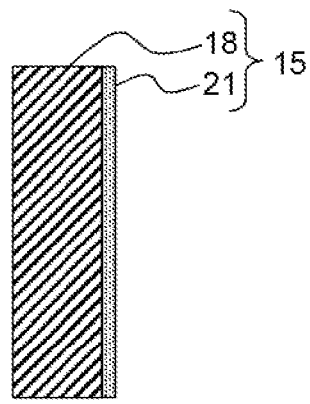
FIG. 6 shows a schematic cross-sectional view of the insulation arrangement in accordance with FIG. 5.
Figure 7:
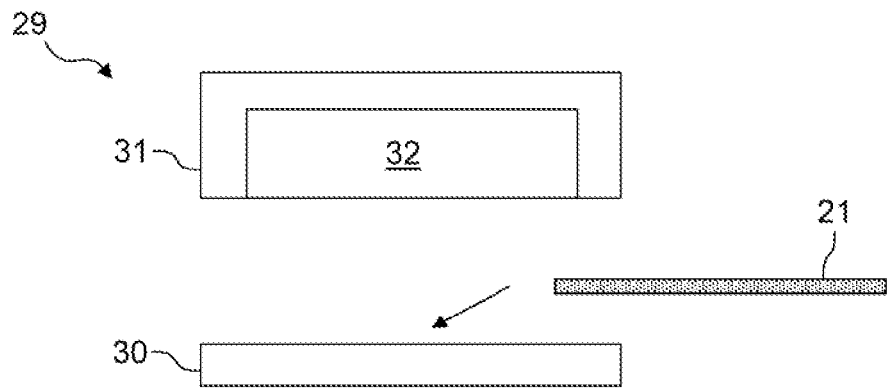
FIG. 7 shows a schematic cross-sectional view of a form of embodiment of a mold for producing the insulation arrangement in accordance with FIG. 5.

FIG. 4 to FIG. 10 show the production of the insulation arrangement 15 as a composite component. To this end the second insulation element 21 is first provided, as a bitumen mat for example (FIG. 4). Subsequently the surface 22 of the second insulation element 21 directed towards the first insulation element 18 is modified in such a way that a permanent connection between the first insulation element 18 and the second insulation element 21 can be achieved. The separation layer 24 is not provided with this form of embodiment of the insulation arrangement 15.

The surface treatment of the surface 22 can be a plasma treatment, a corona treatment or the like for example. An additional coating of one of the insulation elements 18, 21 can also be provided. This can be applied in the production process for example to the second insulation element 21. After a contour of the second insulation element 21 has been produced, said element is placed in the mold 29 shown in FIGS. 7 to 10.

Figure 8:
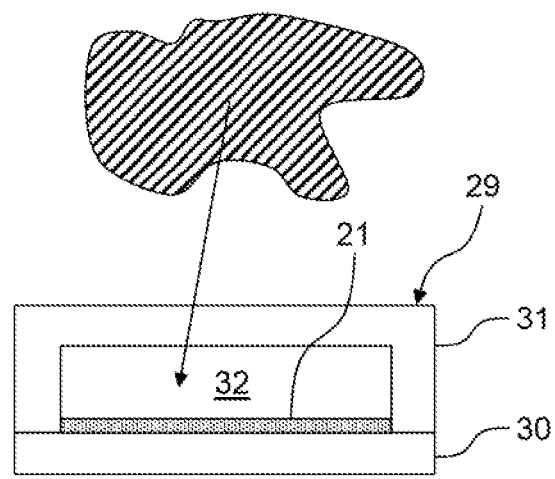
FIG. 8 shows a further schematic cross-sectional view of the mold in accordance with FIG. 7.
Figure 9:
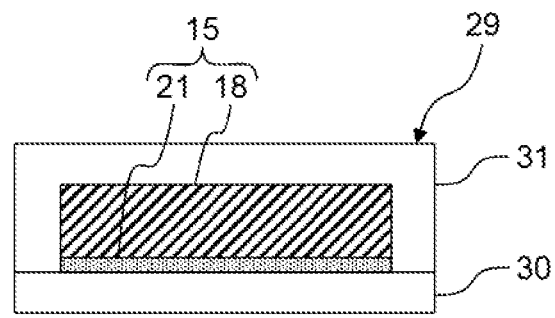
FIG. 9 shows a further schematic cross-sectional view of the mold in accordance with FIG. 7.

The mold 29 is in particular a die casting mold or a casting mold and comprises a lower mold part 30 and an upper mold part 31. The mold 29 comprises a cavity 32, which is a negative of a geometry of the first insulation element 18. After the second insulation element 21 is placed in the mold 29, as shown in FIG. 8, the mold is filled with the liquid plastic material. The plastic material, as explained previously, is a polyurethane foam. During the curing process of the first insulation element 18 the two insulation elements 18, 21 make a permanent connection with one another.

Figure 10:
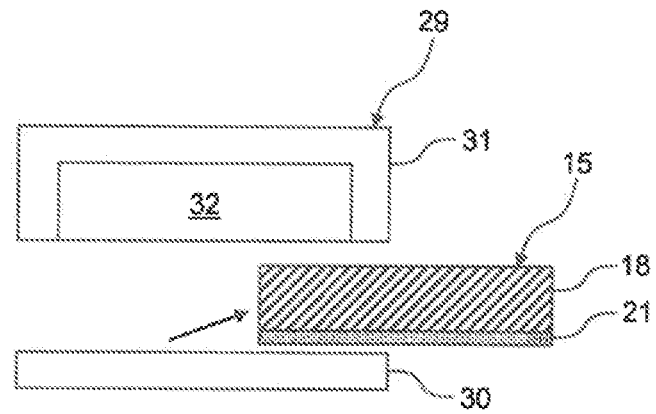
FIG. 10 shows a further schematic cross-sectional view of the mold in accordance with FIG. 7.

To produce the insulation arrangement 15 or the first insulation element 18 respectively two components are mixed for example and are poured into the mold 29. The plastic material can then foam under atmospheric pressure or in a vacuum and fill out the cavity 32 completely. After the complete curing and/or cross-linking of the plastic material, the mold 29, as shown in FIG. 10, is opened and the first insulation element 18 or the insulation arrangement 15 is removed from it. The insulation arrangement 15 can now be removed from the mold 29 as a composite component. Further layers can also be processed in the process, wherein the insulation arrangement 15 arising then contains a number of different individual parts, but can ultimately be further processed and handled as one part.

Easier handling of the insulation arrangement 15 is thus possible. A prefabrication of the insulation arrangement 15 is further possible. The dishwashing compartment 2 can be produced separately from the insulation arrangement 15, since the first insulation element 18 is not foamed directly onto the dishwashing compartment 2. A later generation of variants is possible. The production of the insulation arrangement 15 and the attachment of said arrangement to the dishwashing compartment 2 can easily be integrated into the production of the household dishwasher 1. A number of layers or individual parts can be combined in an upstream process to form a one-piece arrangement. This makes easier handling possible in downstream process steps.

Figure 11:
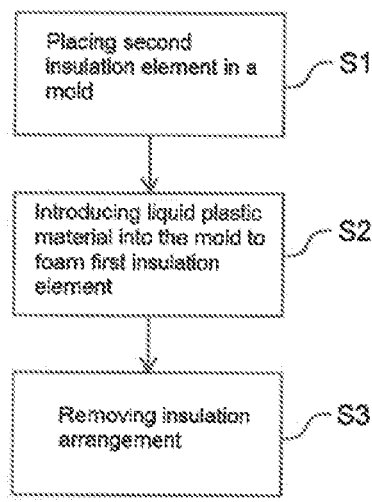
FIG. 11 shows a schematic block diagram of a form of embodiment of a method for producing an insulation arrangement for the household dishwasher in accordance with FIG. 1.

FIG. 11 shows a schematic block diagram of the method explained previously. In a step S1 the second insulation element 21 is placed in the mold 29. In a step S2 the liquid plastic material is introduced into the mold 29 in order to foam the first insulation element 18 onto the second insulation element 21 and in this way form the insulation arrangement 15. In a step S3 the insulation arrangement 15 is removed from the mold.

Figure 12:
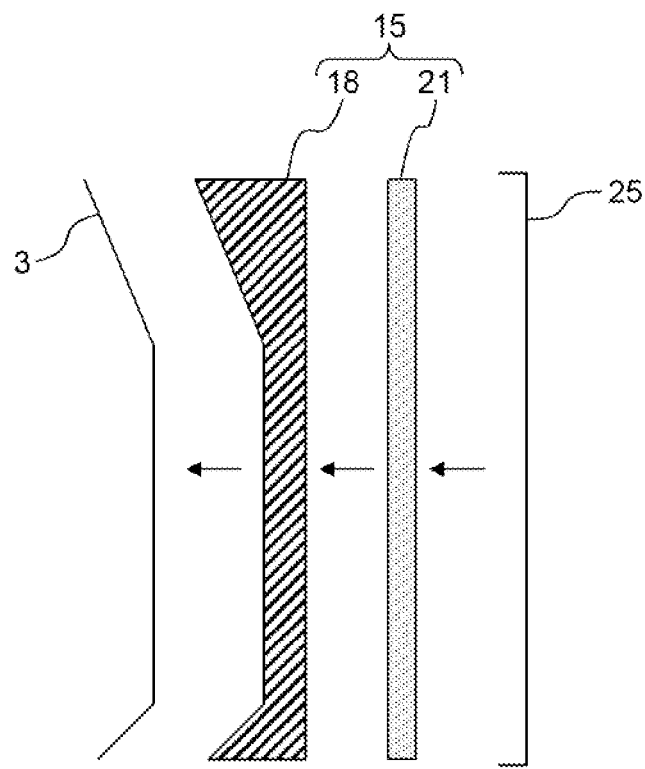
FIG. 12 shows a schematic exploded view of a further form of embodiment of an insulation arrangement for the household dishwasher in accordance with FIG. 1.
Figure 13:
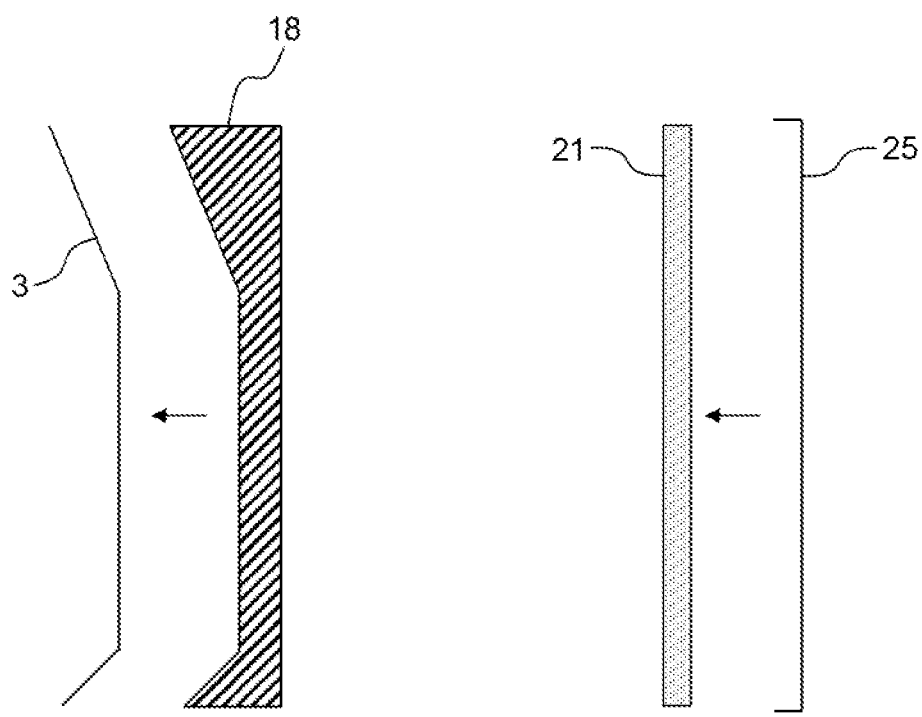
FIG. 13 shows a further schematic exploded view of the insulation arrangement in accordance with FIG. 12.
Figure 14:
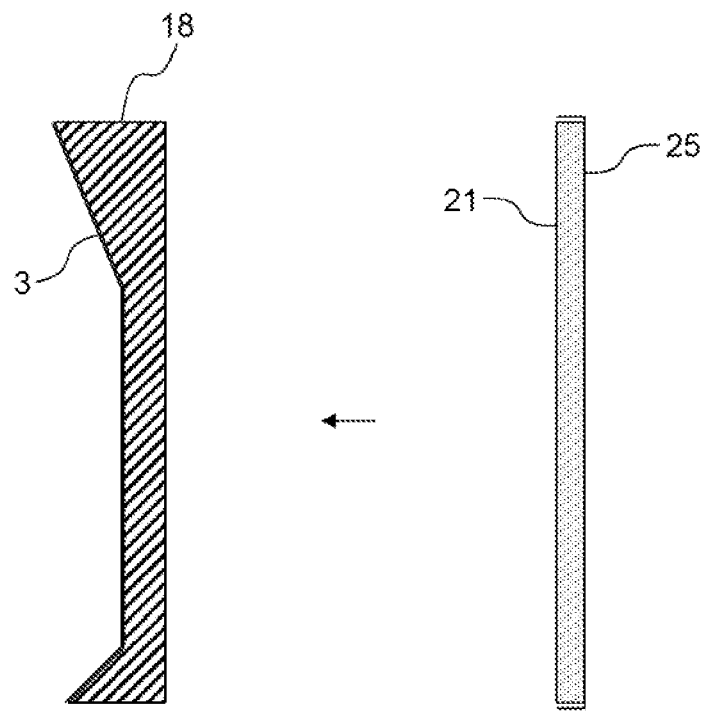
FIG. 14 shows a further schematic exploded view of the insulation arrangement in accordance with FIG. 12.
Figure 15:
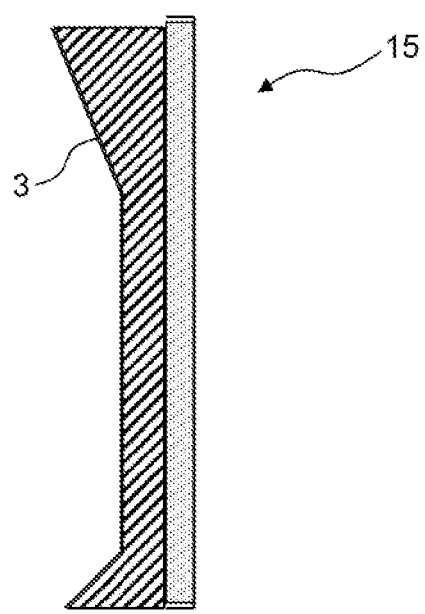
FIG. 15 shows a schematic cross-sectional view of the insulation arrangement in accordance with FIG. 12.

FIGS. 12 to 15 show a further form of embodiment of a method for producing an insulation arrangement 15 as previously explained. Here the insulation arrangement 15 is not embodied as a prefabricated composite component. Instead the insulation arrangement 15 has a number of parts. As FIG. 12 shows, using the door 3 as an example, the insulation elements 18, 21 and the outer casing 25 can be provided as individual parts. The individual parts can, as shown in FIGS. 13 and 14, now be joined together to some extent. For example the first insulation element 18 can be attached to the outer side of a door panel of the door 3 and the second insulation element 21 can be attached to the outer casing 25. Subsequently the pre-assembled modules, as shown in FIG. 15, are joined together. This produces high flexibility in the production. The binding of the first insulation element 18 to the dishwashing compartment 2 is also improved. Different variants of the household dishwasher 1 can be generated more easily.

Figure 16:
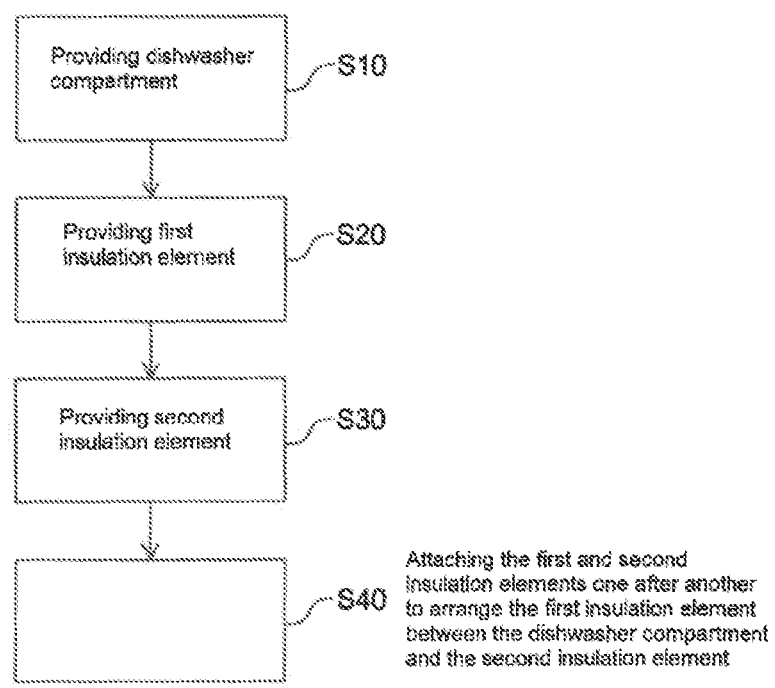
FIG. 16 shows a schematic block diagram of a form of embodiment of a method for producing the household dishwasher in accordance with FIG. 1.

FIG. 16 shows a schematic block diagram of a method explained previously. In a step S10 the dishwasher compartment 2 is provided. In a step S20 the first insulation element 18 is provided. In a step S30 the second insulation element 21 is provided. In a further step S40 the first insulation element 18 and the second insulation element 21 are attached one after the other to the dishwasher compartment 2 in such a way that the first insulation element 18 is arranged between the dishwasher compartment 2 and the second insulation element 21.

Figure 17:
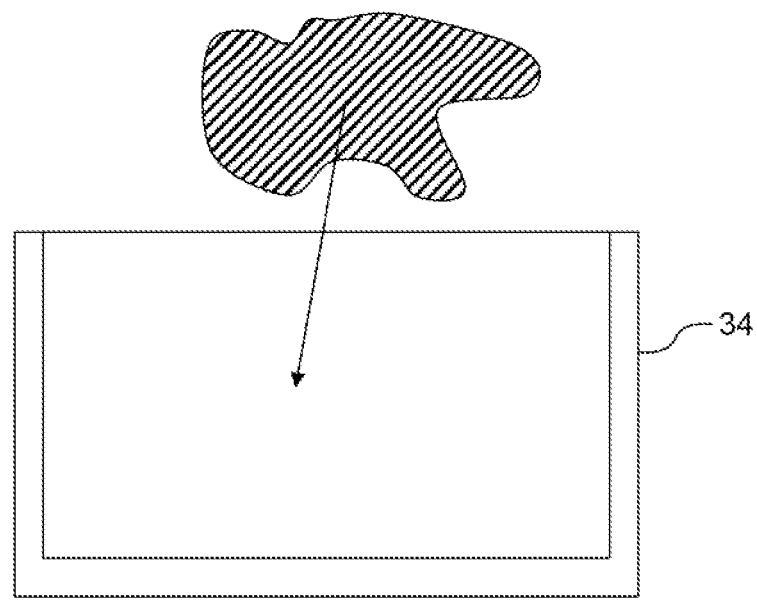
FIG. 17 shows a schematic cross-sectional view of a form of embodiment of a mold for producing the foam block.
Figure 18:
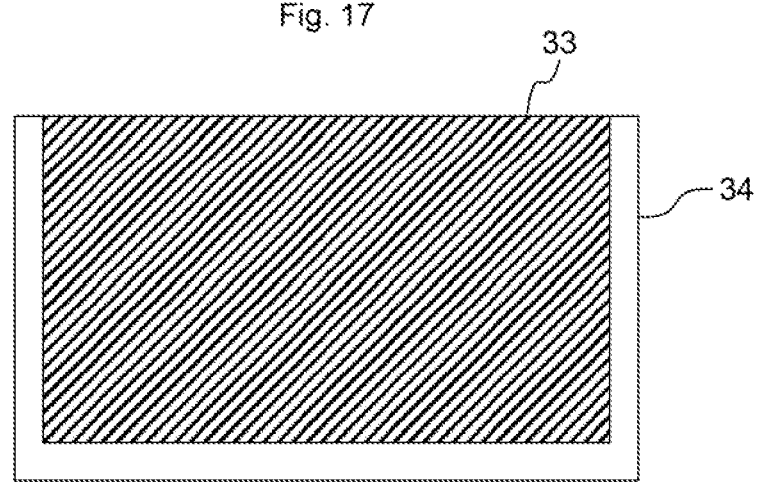
FIG. 18 shows a further cross-sectional view of the mold in accordance with FIG. 17.
Figure 19:
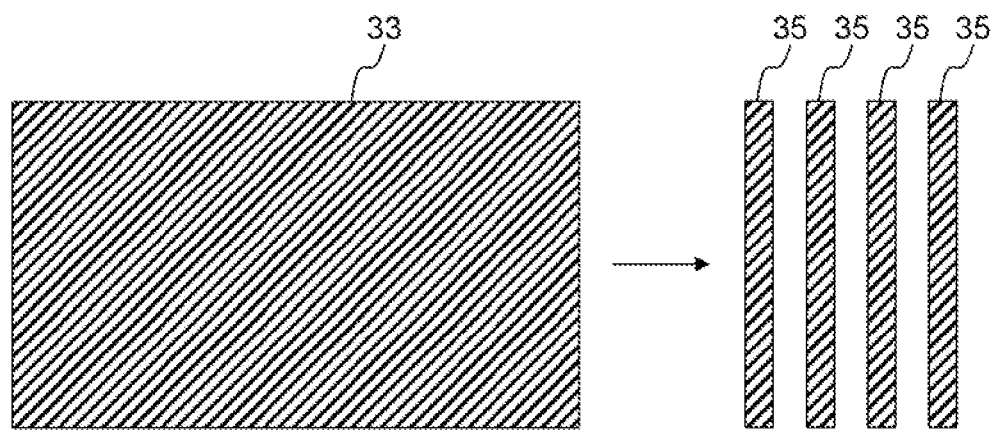
FIG. 19 shows a schematic cross-sectional view of a form of embodiment of a foam block.

FIGS. 17 to 22 show a further form of embodiment of a method for producing an insulation arrangement 15 as previously explained. Here the plastic material of the first insulation element 18 is first foamed as foam block 33 in a mold 34. To this end the mold 34 is filled with plastic material that is still liquid (FIG. 17). The plastic material can foam freely at atmospheric pressure here, whereby an especially low density and thereby especially good heat insulating properties can be achieved. In this case plastic material is used that is tuned specifically to the requirements of the household dishwasher 1. After the plastic material has cured the foam block 33, as is shown in FIG. 19, is divided into blanks 35, which are each molded later to form the first insulation element 18. The blanks 35 can be obtained by cutting the foam block 33 to the desired thickness. The foam block 33 can also be produced with the aid of a continuous method.

Figure 20:
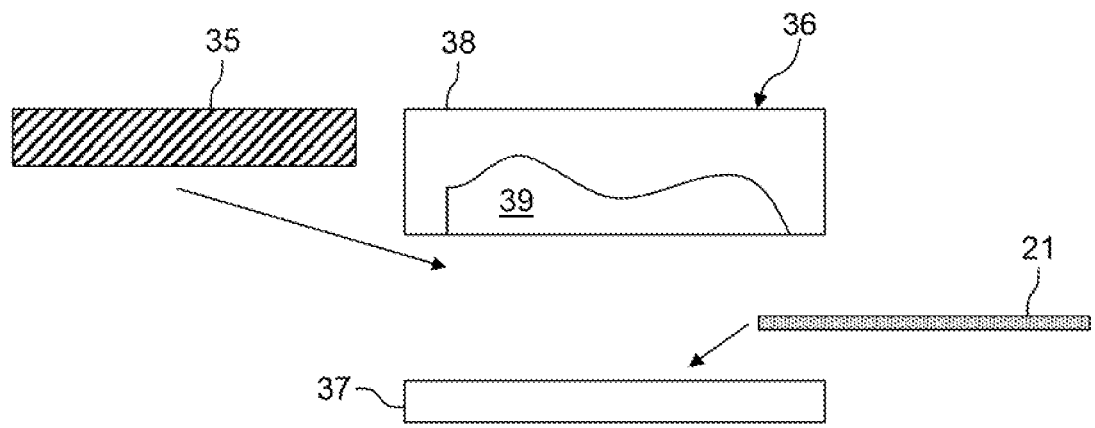
FIG. 20 shows a schematic cross-sectional view of a form of embodiment of a forming press.
Figure 21:
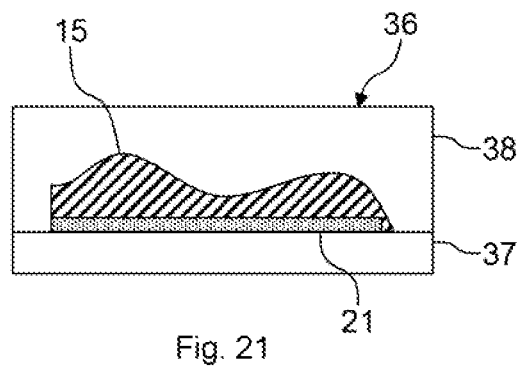
FIG. 21 shows a further schematic cross-sectional view of the forming press.
Figure 22:
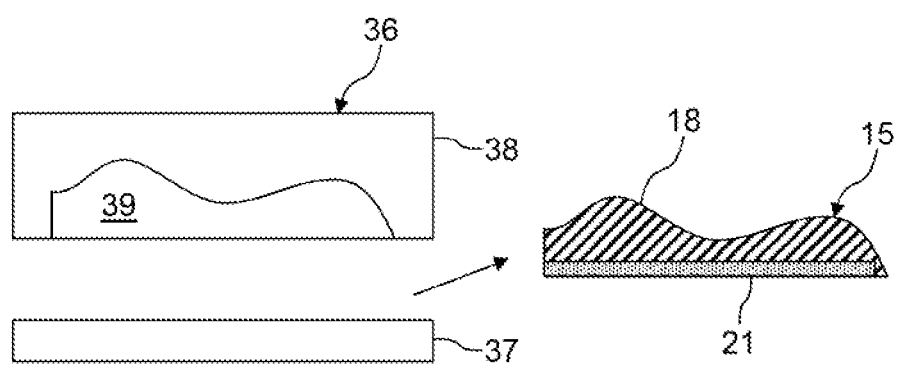
FIG. 22 shows a further schematic cross-sectional view of the forming press.

After the production of the blanks 35, these are placed in a forming press 36 (FIG. 20). The forming press 36 comprises a lower part 37 and an upper part 38. The forming press 36 has a cavity 39, which maps a negative of an external geometry of the first insulation element 18. Optionally the second insulation element 21 can also be placed in the forming press 36. The second insulation element 21 can also be treated with an adhesive in order to guarantee a better adhesion to the plastic material. By closing the forming press 36 (FIG. 21) the flat blank 35 is stamped into an appropriate shape and makes a permanent connection with the second insulation element 21. The shaping can take place under the influence of heat. The blank 35 can however also, as mentioned previously, be pressed without the second insulation element 21 in order to obtain a multi-part insulation arrangement 15 as explained previously.

After its removal from the mold (FIG. 22) the insulation arrangement 15 can then be obtained as a composite part or the first insulation arrangement 18 as an individual part that has the appropriate shape for attachment to the dishwashing compartment 2. The particular advantage here lies in the low density of the foamed plastic material. A low density is thus able to be obtained in the first insulation element 18, whereby its heat insulation properties are improved. The low density also results in a lower use of raw material. A reduced absolute thermal capacity is produced by little material. A low thermal capacity results in an additional heat saving, since material does not have to be heated up. Short cycle times of the forming press 36 compared to production of the first insulation element 18 as a shaped foam part can be achieved. Advantageously a wide diversity of raw materials can be processed for the plastic material.

Figure 23:
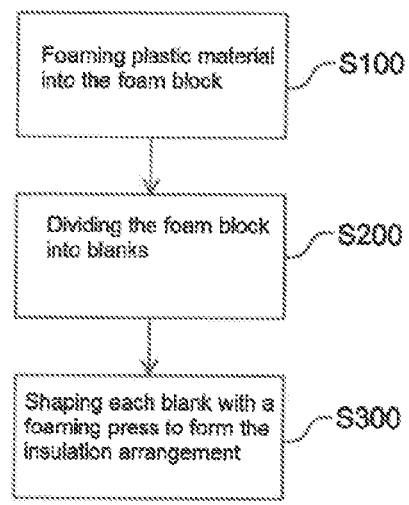
FIG. 23 shows a schematic block diagram of a further form of embodiment of a method for producing an insulation arrangement for the household dishwasher in accordance with FIG. 1.

FIG. 23 shows a schematic block diagram of the method explained previously. In a step S100 the plastic material is foamed into the foam block 33. In a step S200 the foam block 33 is divided up into blanks 35. In a step S300 each blank 35 is shaped with the aid of the forming press 36 to form the insulation arrangement 15. The insulation arrangement 15 in this case can have just the first insulation element 18 or both insulation elements 18, 21.

Although the present invention has been described with reference to exemplary embodiments, it is able to be modified in many ways.

The invention claimed is:

1. A method for producing an insulation arrangement for a functional compartment of a household appliance, said method comprising:

foaming a plastic material to form a foam block;

dividing the foam block into blanks; and shaping each of the blanks with a forming press to form insulation element and to connect the first insulation element and a second insulation element to form an insulation arrangement, wherein the first insulation element and the second insulation element have at least one of a same length or a same width, and wherein the second insulation element comprises a bitumen material.

2. The method of claim 1, wherein the functional compartment is a dishwashing compartment.

3. The method of claim 1, wherein the household appliance is a household dishwasher.

4. The method of claim 1, further comprising:

placing a second insulation element in the forming press before the blank is shaped to form the first insulation element; and wherein the first insulation element is connected to the second insulation element as the blank is shaped with the forming press.

5. The method of claim 4, wherein the first insulation element is connected to the second insulation element with the aid of an adhesive.

6. The method of claim 1, wherein the plastic material is foamed at atmospheric pressure.

7. The method of claim 1, wherein the plastic material is foamed in an open mold.

\* \* \* \* \*